(12) United States Patent
Yamamoto (10) Patent No.: US 7,031,006 B2
(45) Date of Patent: Apr. 18, 2006

(54) FACSIMILE APPARATUS AND COMMUNICATION SYSTEM, IN WHICH DATA THAT IS NOT SUITABLE FOR DISPLAYING ON DISPLAY OF EXTERNAL TERMINAL AND PORTABLE TERMINAL, OF ELECTRONIC MAIL DATA OR INTERNET DATA RECEIVED BY EXTERNAL TERMINAL OR PORTABLE TERMINAL CAN BE DISPLAYED

(75) Inventor: Nobuyoshi Yamamoto, Shizuoka (JP)

(73) Assignee: NEC Corporation, Tokyo (JP)

( * ) Notice: Subject to any disclaimer, the term of this patent is extended or adjusted under 35 U.S.C. 154(b) by 1008 days.

(21) Appl. No.: 09/767,731

(22) Filed: Jan. 24, 2001

(65) Prior Publication Data

US 2001/0012121 A1 Aug. 9, 2001

(30) Foreign Application Priority Data

Feb. 4, 2000 (JP) .............................. 2000-028383

(51) Int. Cl.
*G06F 15/00* (2006.01)

(52) U.S. Cl. ..................... 358/1.15; 358/1.16; 715/500; 715/526; 715/527; 455/411; 455/462

(58) Field of Classification Search ...... 358/1.15–1.17; 455/411, 462, 557, 556.1, 556.2, 344; 379/100.02, 379/100.06, 100.09, 100.15, 88.12, 88.17; 715/500, 526, 527
See application file for complete search history.

(56) References Cited

U.S. PATENT DOCUMENTS 5,550,861 A * 8/1996 Chan et al. .................. 375/222
5,835,577 A * 11/1998 Disanto et al. .......... 379/93.19
6,145,084 A * 11/2000 Zuili et al. ................... 713/201
6,430,624 B1 * 8/2002 Jamtgaard et al. .......... 709/246
6,434,403 B1 * 8/2002 Ausems et al. .......... 455/556.2
6,728,534 B1 * 4/2004 Izumi et al. .............. 455/426.1

FOREIGN PATENT DOCUMENTS

| JP | 4-7943 | 4/1992 |
| JP | 6-6551 | 1/1994 |
| JP | 10-65773 | 3/1998 |
| JP | 10-307766 | 11/1998 |
| JP | 10-322509 | 12/1998 |
| JP | 11-225371 | 8/1999 |
| JP | 11-348386 | 12/1999 |
| JP | 11-355498 | * 12/1999 |

OTHER PUBLICATIONS

Japanese Office Action dated Jul. 12, 2002 with English translation of encircled portion.

* cited by examiner

*Primary Examiner*—Twyler M. Lamb (74) *Attorney, Agent, or Firm*—Whitham, Curtis, Christofferson & Cook P.C.

(57) ABSTRACT

A facsimile apparatus, includes a radio unit, a display unit and a print unit. The radio unit communicates with a terminal apparatus which can receive one of an electronic mail data and the Internet data. The display unit displays a first portion of one of the electronic mail data and the Internet data received by the radio unit from the terminal apparatus. The print unit prints a second portion other than the first portion of the one of the electronic mail data and the Internet data received by the radio unit from the terminal apparatus. The second portion is not displayed by the display unit.

21 Claims, 5 Drawing Sheets

FACSIMILE APPARATUS AND
COMMUNICATION SYSTEM, IN WHICH
DATA THAT IS NOT SUITABLE FOR
DISPLAYING ON DISPLAY OF EXTERNAL
TERMINAL AND PORTABLE TERMINAL,
OF ELECTRONIC MAIL DATA OR
INTERNET DATA RECEIVED BY EXTERNAL
TERMINAL OR PORTABLE TERMINAL CAN
BE DISPLAYED

BACKGROUND OF THE INVENTION

1. Field of the Invention

The present invention relates to a facsimile apparatus and a communication system.

2. Description of the Related Art

Recently, a portable terminal has been known for receiving and displaying thereon electronic mail data and home page data of the Internet (data described by using HTML; Hyper Text Markup Language, and hereafter, referred to as Internet data). Here, the display of the portable terminal is narrow in its display area. Thus, it is not suitable for the indication of a large amount of electronic mail data or Internet data.

On the other hand, even in a case of an apparatus that is mounted within a house and can receive the electronic mail data and the Internet data, a display having a wide display area (15 to 17 inches) similar to a display (CRT, LCD) of a personal computer is not always necessary, from the viewpoints of a low cost and space saving.

Moreover, a printer is required in addition to the personal computer, in order to print out the electronic mail data and the Internet data received by the personal computer.

Recently, NTT DOKOMO, INC provides an on-line information service for a portable telephone referred to as an I-mode. The i-mode is the Internet connection service for a portable telephone. A portable telephone receiving the service of the i-mode can receive the Internet data. However, the content displayed on a display of the portable telephone is only a site (home page) corresponding to the i-mode. Various techniques including a table, a frame, a style sheet and Java are used in a typical home page. However, data that can be displayed (recognized) in the current I-mode service is only character data and monochrome picture data having a small size. By the way, the techniques for accessing the Internet from the portable terminal are provided by various companies, in addition to th i-mode.

Japanese Laid Open Patent Application (JP-A-Heisei, 10-322509) discloses the following portable facsimile apparatus. This is provided in order to transmit and receive electronic mail data, receive Internet data and output the contents of the electronic mail data and the Internet data. So, it receives the electronic mail data from an electronic mail server by using a digital interface, stores the received data in RAM, and outputs the stored data from a printer. Also, this transfers the stored data to any connected device through a communication line by using the digital interface.

Japanese Laid Open Patent Application (JP-A-Heisei, 10-65773) discloses the following Internet terminal. This has a modem to connect to a PHS (Personal Handyphone System) telephone connection terminal and/or a public telephone line built in one body, and receives an Internet signal from the PHS telephone connection terminal and/or the public telephone line, and then displays the content of a signal processed by a processor on an external television receiver through a built-in television encoder circuit, for the sake of Internet transmission and reception.

Japanese Laid Open Patent Application (JP-A-Heisei, 10-307766) discloses the following database access method and manner, A gateway unit that is connected through a communication unit to a system on a center side and connected through a telephone network to a telephone network terminal is provided with: a WWW client connection unit connected to the communication unit; a PB (Private Branch) signal reception function unit connected to the telephone network for receiving an input push button signal; a voice guide generation function unit connected to the telephone network for outputting a voice guide; and an information conversation function unit for converting a PB signal into proper information that can be recognized by a database function unit, and giving to a WWW client function unit, and converting information received from the communication unit in the WWW client function unit into a proper information, and then transferring to a voice guide function unit.

Japanese Laid Open Patent Application (JP-A-Heisei, 11-225371) discloses the following portable information terminal. In a case of a transmission from an electronic mail server, an electronic mail transmitter/receiver is automatically actuated. A reception of the electronic mail is started after a line is set at a call state. In a case of a transmission, a telephone number is entered to thereby specify a transmission destination by using the similar unit. If it is judged as a communication to the electronic mail server from the telephone number, the electronic mail transmitter/receiver is automatically actuated to then start the transmission of the electronic mail.

It is desirable that the data which are not suitable for an indication on a display of a portable terminal or an external terminal, in electronic mail data or Internet data received by the external terminal or the portable terminal, can be read or browsed by a simple apparatus.

Also, it is desirable that the electronic mail data or the Internet data received by a plurality of external terminals or portable terminals can be read or browsed by the simple apparatus.

SUMMARY OF THE INVENTION

The present invention is accomplished in view of the above mentioned problems. Therefore, an object of the present invention is to provide a facsimile apparatus and communication system, in which data that are not suitable for displaying on a display of an external terminal or a portable terminal, of electronic mail data or the Internet data received by the external terminal or portable terminal can be displayed. Another object of the present invention is to provide a facsimile apparatus and communication system, in which the electronic mail data or the Internet data received by a plurality of external terminals or portable terminals can be displayed.

In order to achieve an aspect of the present invention, a facsimile apparatus includes: a radio unit communicating with a terminal apparatus which can receive one portion of electronic mail data and the Internet data; a display unit displaying a first portion of one portion of the electronic mail data and the Internet data received by the radio unit from the terminal apparatus; and a print unit printing a second portion other than the first portion of the one portion of the electronic mail data and the Internet data received by the radio unit from the terminal apparatus, wherein the second portion is not displayed by the display unit.

In this case, the facsimile apparatus further includes: a register unit registering the terminal apparatus and a storing unit storing the one portion of the electronic mail data and the Internet data received by the radio unit from the terminal apparatus, and wherein the storing unit stores the one portion of the electronic mail data and the Internet data received by the radio unit from the terminal apparatus registered in the register unit, and does not store the one portion of the electronic mail data and the Internet data received by the radio unit from the terminal apparatus which is not registered in the register unit.

Also in this case, the register unit registers a plurality of the terminal apparatuses, and wherein the storing unit stores the one portion of the electronic mail data and the Internet data received by the radio unit from one of the plurality of the terminal apparatuses registered in the register unit, and does not store the one portion of the electronic mail data and the Internet data received by the radio unit from one of the plurality of the terminal apparatuses which are not registered in the register unit.

Further in this case, the display unit displays a plurality of titles of the one portion of the electronic mail data and the Internet data received by the radio unit from the terminal apparatus, and wherein the print unit prints one portion of the electronic mail data and the Internet data corresponding to a selected one of the plurality of titles displayed in the display unit.

In this case, the facsimile apparatus further includes: a register unit registering a plurality of the terminal apparatuses and a storing unit storing the one portion of the electronic mail data and the Internet data received by the radio unit from the plurality of the terminal apparatuses, and wherein the display unit shows which one of the plurality of the terminal apparatuses registered in the register unit outputs each of the one portion of the electronic mail data and the Internet data stored by the storing unit.

Also in this case, the print unit prints the one portion of the electronic mail data and the Internet data received from one of the plurality of the terminal apparatuses selected with reference to the display unit.

Further in this case, the one portion of the electronic mail data and the Internet data received by the radio unit from the terminal apparatus is divided into the first and second portions based on the data amount of the one.

In this case, the one portion of the electronic mail data and the Internet data received by the radio unit from the terminal apparatus is divided into the first and second portions based on the kind of the data of the one.

Also in this case, the radio unit communicates with the terminal apparatus wirelessly with the Bluetooth standard.

Further in this case, the radio unit communicates with the terminal apparatus wirelessly with the PIAFS (PHS Internet Access Forum Standard).

In this case, the Internet data is the HTML data.

Also in this case, the first portion corresponds to a portion which can be displayed by the terminal apparatus, of the one portion of the electronic mail data and the Internet data received by the terminal apparatus, and the second portion corresponds to a portion which can not be displayed by the terminal apparatus, of the one portion of the electronic mail data and the Internet data received by the terminal apparatus.

Further in this case, the first portion corresponds to data of a Web site complied with the Internet connection service for a portable telephone including the i-mode.

In this case, the first portion corresponds to a portion other than an attachment file data of an electronic mail data.

Also in this case, a value of the data amount of the one is adjusted by a user of the facsimile apparatus.

In order to achieve another aspect of the present invention, a communication system includes: a facsimile apparatus; and a terminal apparatus, and wherein the terminal apparatus includes: a data receiving unit receiving one portion of electronic mail data and the Internet data; a display unit displaying a first portion of the received one portion of the electronic mail data and the Internet data; and a data transfer unit transferring at least a portion of the received one portion of the electronic mail data and the Internet data, and wherein the facsimile apparatus includes: a radio unit receiving at least portion transferred by the data transfer unit; a display unit displaying a second portion of at least portion received by the radio unit; and a print unit printing a third portion other than the second portion of at least portion received by the radio unit, wherein the third portion is not displayed by the display unit.

In this case, the first portion is substantially identical to the second portion.

Also in this case, the facsimile apparatus further includes: a register unit registering the terminal apparatus; and a storing unit storing the one portion of the electronic mail data and the Internet data received by the radio unit from the terminal apparatus, and wherein the storing unit stores the one portion of the electronic mail data and the Internet data received by the radio unit from the terminal apparatus registered in the register unit, and does not store the one portion of the electronic mail data and the Internet data received by the radio unit from the terminal apparatus which is not registered in the register unit.

Further in this case the display unit displays a plurality of titles of the one portion of electronic mail data and the Internet data received by the radio unit from the terminal apparatus, and wherein the print unit prints one portion of the electronic mail data and the Internet data corresponding to a selected one of the plurality of titles displayed in the display unit.

In the present invention, if the detailed information (for example, the detail of a home page in the case of the Internet, the content of an attached file in the case of the electronic mail, and the like) of the Internet and the electronic mail is desired to be viewed, the detailed information attained by using a browsing and electronic mail function can be viewed by printing out it.

Also, in the present invention, the simple content (for example, a level of a home page corresponding to the i-mode in the case of the Internet, only a text in the case of the electronic mail and the like) can be displayed on a cordless slave unit belonging to this facsimile apparatus.

Also, in the present invention, the detailed information (for example, the detail of the home page in the case of the Internet, the content of the attached file in the case of th electronic mail, and the like) of the Internet and the electronic mail, which can be attained in the radio portable terminals, such as the current portable telephone, the PHS and the like, being capable of performing the communication of the electronic mail and the Internet browsing of the i-mode and the like, and cannot be displayed in those terminals, can be captured into this facsimile apparatus through standardized digital data communication, and printed out to be read.

DESCRIPTION OF THE PREFERRED EMBODIMENTS

An embodiment of a facsimile apparatus of the present invention will be described below with reference to the attached drawings.

Figure 1:
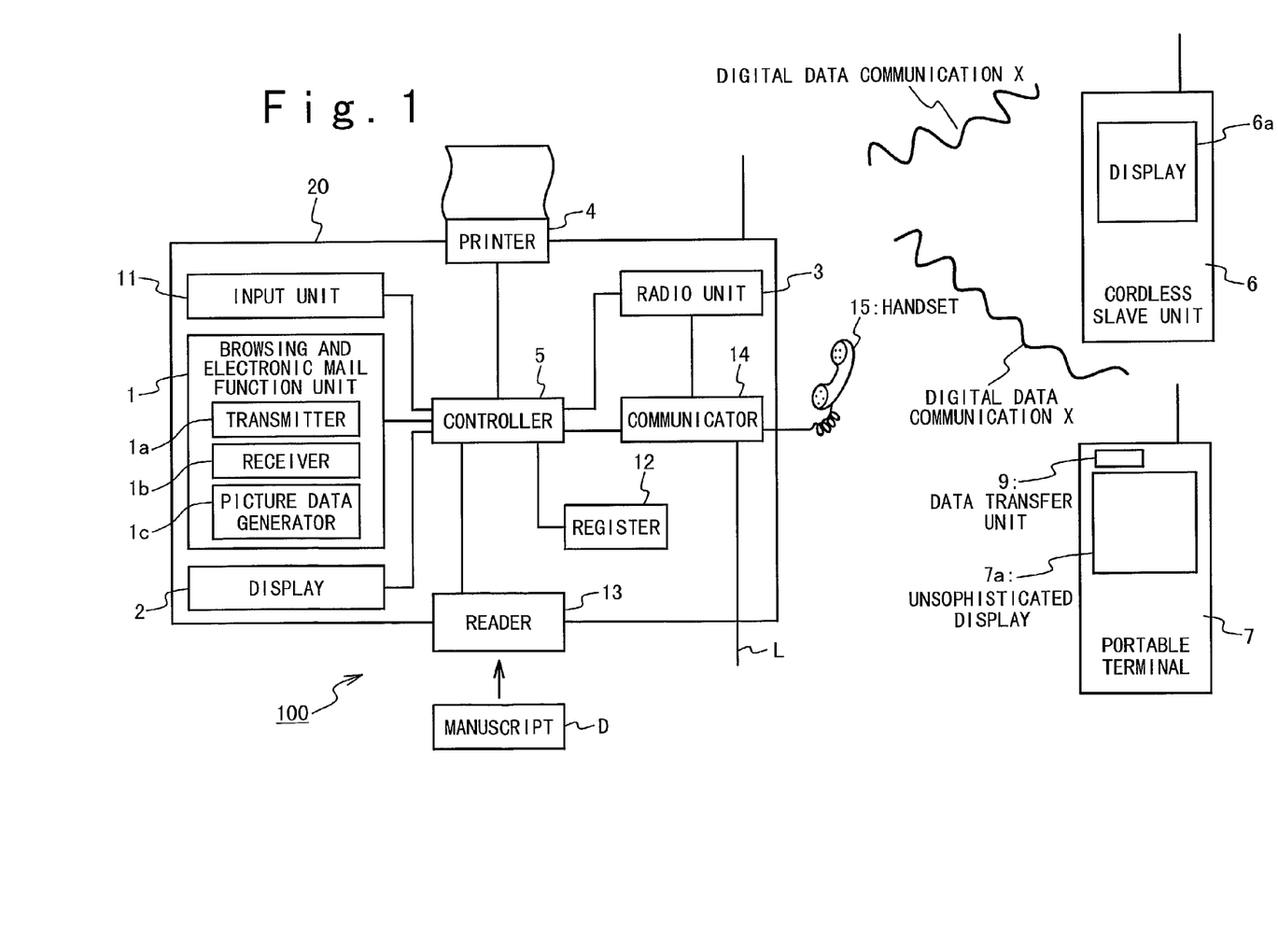
FIG. 1 is a block diagram showing an embodiment of a facsimile apparatus of the present invention.

In FIG. 1, a symbol 100 denotes a facsimile apparatus in this embodiment.

FIG. 1 is a block diagram mainly showing the configuration corresponding to a read of the Internet and an electronic mail function in the facsimile apparatus 100.

The facsimile apparatus 100 in this embodiment has a device body 20 and a cordless slave unit 6 belonging to the device body 20. The device body 20 has a browsing and electronic mail function unit 1, a display 2, a radio unit 3, a printer 4, a controller 5, an input unit 11, a register 12, a reader 13, a communicator 14 and a handset 15.

The device body 20 is connected through a line L to a WWW (WWW: World Wide Web) server (not shown). The line L is a PSTN (Public Switched Telephone Network) or an ISDN (Integrated Services Digital Network) line.

A display 6a is mounted in the cordless slave unit 6. The display 6a is an LCD (Liquid Crystal Display) unit. The LCD of the display 6a is narrow in display screen. Thus, a large amount of data is not displayed.

The browsing and electronic mail function unit 1, the display 2, the radio unit 3, the printer 4, the input unit 11, the register 12, the reader 13 and the communicator 14 are connected to the controller 5. The controller 5 controls the browsing and electronic mail function unit 1, the display 2, the radio unit 3, the printer 4, the input unit 11, the register 12, and the printer 4.

The communicator 14 is connected to the controller 5, the radio unit 3, the handset 15 and the line L. The communicator 14 performs a line control on the line L at a time of a transmission/reception.

The communicator 14 modulates a transmission signal inputted from the radio unit 3 or the handset 15, and outputs to the line L. The communicator 14 demodulates a reception signal inputted from the line L, and outputs to the radio unit 3 or the handset 15.

The reader 13 reads in a read manuscript D to generate a FAX transmission signal, and outputs to the controller 5. The communicator 14 modulates the FAX transmission signal inputted from the controller 5, and outputs to the line L. The communicator 14 demodulates a FAX reception signal inputted from the line L, and outputs to the controller 5. The printer 4 records the FAX reception signal inputted from the controller 5.

A URL (Universal Resource Locator) data are inputted to the input unit 11. A record command is inputted to the input unit 11. The record command indicates recording or printing the data, which are not displayed on the displays 2, 6a, in the electronic mail data and/or the Internet data received in the browsing and electronic mail function unit 1. Also, the record command indicates recording or printing the electronic mail data and/or the Internet data received by the radio unit 3 from a portable terminal 7.

Moreover, a user enters data to register in the register 12 by a portable terminal 7, which communicates the electronic mail data and/or the Internet data with the device body 20, to the input unit 11. The number of portable terminals 7 communicating with the device body 20 is not limited to a singular. A plurality of portable terminals 7 can be registered. The input data are the data to specify (identify) the portable terminal 7 to be registered. It may be a telephone number of the portable terminal 7.

The browsing and electronic mail function unit 1 is composed of a transmitter 1a, a receiver 1b and a picture data generator 1c.

The transmitter 1a connected through the line L to the WWW server transmits the URL data inputted from the input unit 11, to the WWW server.

The receiver 1b connected through the line L to the WWW server receives the HTML data (Internet data) specified in accordance with the URL data from the WWW server.

The picture data generator 1c generates picture data corresponding to the HTML data received by the receiver 1b. The whole or a part of the generated picture data are displayed through the controller 5 on the display 2.

The browsing and electronic mail function unit 1 has a function of browsing a home page of the Internet and a function of transmitting and receiving an electronic mail. The browsing and electronic mail function unit 1 can browse not only a home page corresponding to the i-mode but also a usually typical home page.

The browsing and electronic mail function unit 1 stores therein all the data (including both the simple information and the detailed information) of the Internet data and the electronic mail data, which are received by the browsing and electronic mail function unit 1, or which are received by the portable terminal 7 and received by the portable terminal 7 through the radio unit 3.

The browsing and electronic mail function unit 1 responds to a control command edited by the controller 5, and sends out the data stored in the browsing and electronic mail function unit 1 to the printer 4.

The display 2 displays thereon the simple information in the Internet data and/or the electronic mail data which are received by the browsing and electronic mail function unit 1, or which is received by the portable terminal 7 and received from the portable terminal 7 through the radio unit 3. The display 2 is the LCD device. The LCD of the display 2 is narrow in display screen. Thus, a large number of data can not be displayed. Hence, only the simple information is displayed on the display 2.

The radio unit 3 carries out a digital data communication X with the radio portable terminal 7, such as a portable telephone, the PHS and the like, corresponding to the Internet browsing and the electronic mail. Also, the radio unit 3 carries out the digital data communication X with the cordless slave unit 6.

The printer 4 responds to the control command edited by the controller 5, and records or prints the data sent out by the browsing and electronic mail function unit 1 (prints out it on a paper).

The controller 5 edits a control command, in response to a record command inputted from the input unit 11, and outputs the control command to the browsing and electronic mail function unit 1 and the printer 4.

The controller 5 classifies the Internet data and/or the electronic mail data, which are received by the browsing and electronic mail function unit 1, or which are received by the portable terminal 7 and received from the, portable terminal 7 through the radio unit 3, into a simple information and detailed information, in accordance with the kind of the data. Here, the simple information implies the information to be displayed on the display 2 or 6a. The detailed information implies the information that is recorded in the printer 4 and not displayed on ht display 6a.

Actually, the kind of the data is classified into text data and the data except the text data. The text data are classified into simple information, and the data (picture graphic data including TIFF (Tag Image File Format) data and the like) except the text data are classified into detailed information. Or, the simple information implies data of a home page corresponding to the i-mode in the case of the Internet data. Also, as often found in the electronic mail data, if an attached file is contained in main text data, the main text data are classified as the simple information, and the attached file are classified as the detailed information.

The controller 5 can carry out the classification between the simple information and the detailed information, in accordance with data amount instead of the kind of the data. Received data of a certain unit is classified into the detailed information if its data amount is equal to or greater than a standard value, and classified into the simple information is it is less than the standard value. The Internet data communicated in a packet is classified into the simple information and the detailed information, in accordance with a data amount described in a header of its packet. In the above case, a value of a data amount serving as a classification standard can be stored in advance in the device body 20. Also, a user can define the value of the data amount serving as the classification standard.

Also, the classification between the simple information and the detailed information can be done in accordance with the combination of the kind of the data and the data amount.

Each of the display 2 and the display 6a displays thereon the simple information from the Internet data and the electronic mail data, which are received by the browsing and electronic mail function unit 1, or which are received by the portable terminal 7 and received from the portable terminal 7 through the radio unit 3, by the control of the controller 5.

In the facsimile apparatus 100, the contents of the Internet and the electronic mail, which are received by the browsing and electronic mail function unit 1, or which are received by the portable terminal 7 and received from the portable terminal 7 through the radio unit 3, are simply browsed on the display 2 of the device body 20 and the display 6a of the cordless slave unit 6, as the simple information. If its detailed information is desired to be browsed, it is recorded in the printer 4 of the device body 20.

The portable terminal 7 is the portable terminal corresponding to the i-mode (the service of NTT DOKOMO, INC). The portable terminal 7 maybe an external device having no relation, such as a master machine and a slave machine, with the device body 20. The portable terminal 7 has the simple browsing function and electronic mail function of the Internet. The Internet data and/or the electronic mail data received by the portable terminal 7 can be only simply unsophisticaly browsed on a display 7a in the portable terminal 7. For example, an attached file cannot be read in the case of the electronic mail. The display 7a is the LCD device. The LCD of the display 7a is narrow in display screen. Thus, a large amount of data are not displayed.

By the way, the portable terminal 7 is not limited to the portable terminal corresponding to the i-mode. If it can receive the Internet data and/or the electronic mail data, it may be another terminal. Moreover, its terminal may be a terminal besides the portable usage.

The portable terminal 7 has a data transfer unit 9. The data transfer unit 9 transfers the Internet data and/or the electronic mail data to the external device containing the facsimile apparatus 100, in accordance with a protocol of a digital data communication X. The facsimile apparatus 100 that is a transfer destination of the data from the data transfer unit 9 is registered by a user. A telephone number of the facsimile apparatus 100 is registered in the portable terminal 7. The data transfer unit 9, when receiving the Internet data and/or the electronic mail data, responses to the operation of the user of the portable terminal 7, or automatically calls the registered telephone number of the facsimile apparatus 100, and then transfers the data to the facsimile apparatus 100.

Figure 2:
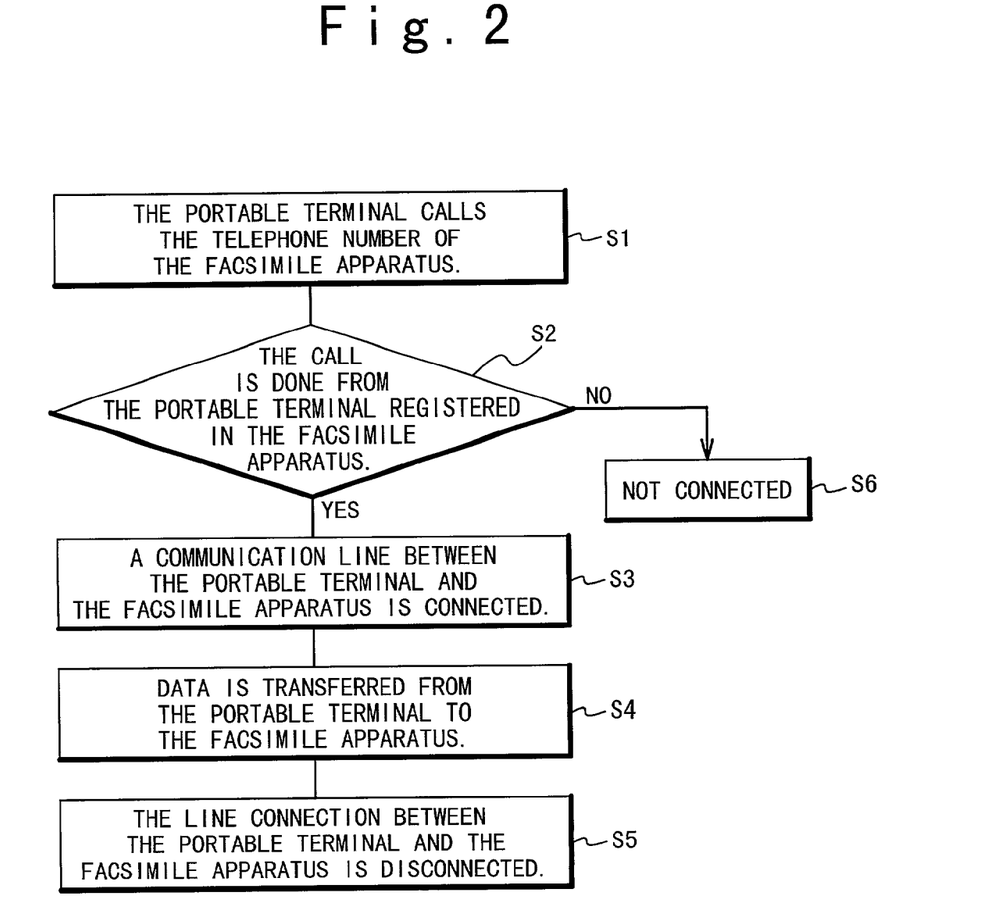
FIG. 2 is a flowchart showing an example of a flow when data are transferred from an external terminal to a facsimile apparatus in this embodiment.

As shown at a step S1 of FIG. 2, when the portable terminal 7 receives the Internet data and/or the electronic mail data, the data transfer unit 9 calls the telephone number of the facsimile apparatus 100. The facsimile apparatus 100 judges whether or not the call is done from the portable terminal 7 registered in the register 12 (Step S2).

If it is judged as the judged result that the call is done from the portable terminal 7 registered in the register 12 (Step S2-Y), a communication line between the portable terminal 7 and the facsimile apparatus 100 is connected (Step S3). When the line between the portable terminal 7 and the facsimile apparatus 100 is connected, the portable terminal 7 transfers the received Internet data and/or electronic mail data to the facsimile apparatus 100 (Step S4). When its data transfer is ended, the line connection between the portable terminal 7 and the facsimile apparatus 100 is disconnected (Step S5). If it is judged as the judged result that the call is not done from the portable terminal 7 registered in the register 12 (Step S-N), the communication line between the portable terminal 7 and the facsimile apparatus 100 is not connected (Step S6).

At the step S4, the facsimile apparatus 100 receives all the data of the Internet data and/or the electronic mail data received by the portable terminal 7, from the data transfer unit 9.

Figure 3:
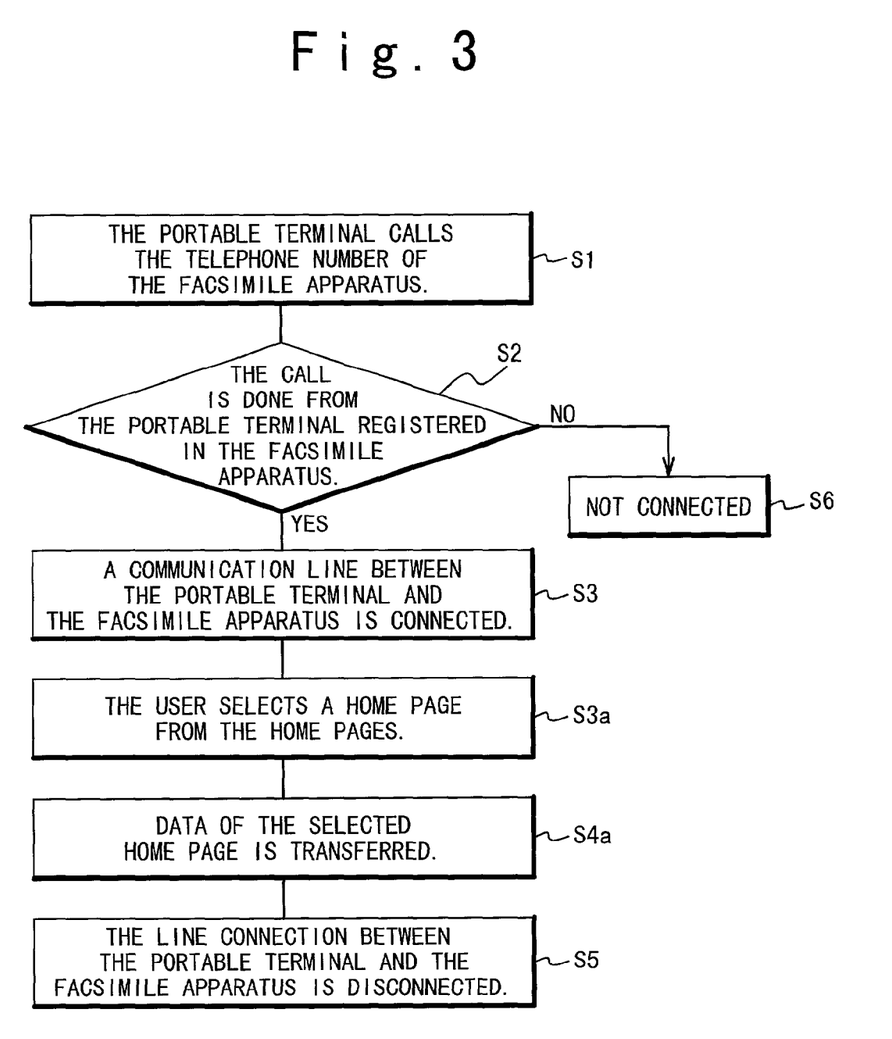
FIG. 3 is a flowchart showing another example of a flow when data are transferred from an external terminal to a facsimile apparatus in this embodiment.

Or, as described below, the facsimile apparatus 100 can receive a part of the Internet data and/or the electronic mail data received by the portable terminal 7, from the data transfer unit 9. As shown in FIG. 3, at the stage (Step S3) at which the line between the portable terminal 7 and the facsimile apparatus 100 is connected, a plurality of titles (indexes) of the Internet data and/or the electronic mail data received by the portable terminal 7 are displayed on the display 2 of the device body 20. The user operates the input unit 11, and selects a title to be transferred to the facsimile apparatus 100, from the displayed titles (Step 3a). Thus, a selection information corresponding to the selected title is generated by the controller 5, and transmitted from the radio unit 3. The portable terminal 7 receives the selection information, and the data transfer unit 9 reads out the data of the title (the detailed information) corresponding to the selection information. After that, the data of the selected title is transferred from the portable terminal 7 to the facsimile apparatus 100 (Step 4a).

The above case is the example when the facsimile apparatus 100 selects (controls) the data to be transferred to the facsimile apparatus 100. Instead of this example, the portable terminal 7 can control the data to be transferred to the facsimile apparatus 100. The data transfer unit 9, if the data amount of the Internet data and/or the electronic mail data received by the portable terminal 7 exceeds a preset value, wirelessly calls the facsimile apparatus 100. After the establishment of the wireless connection to the radio unit 3, it can transfer the whole or a part of the reception data.

Also, the data transfer unit 9 can transfer the reception data to the facsimile apparatus 100, depending on the kind of the Internet data and/or the electronic mail data received by the portable terminal 7. Here, the dependence on the kind of the data implies that reception data, for example, if including picture data, are transferred to the facsimile apparatus 100.

In the above case, each of the predetermined data amount and the kind of the data can be set in the portable terminal 7 in advance or by the operation of the user.

Moreover, if the detailed portion, which is not displayed on the display 7a, in the Internet data and/or the electronic mail data received by the portable terminal 7 is desired to be read or displayed, the user can operate the portable terminal 7 on each time and transfer the whole or a part of the reception data to the facsimile apparatus 100.

Figure 5A:
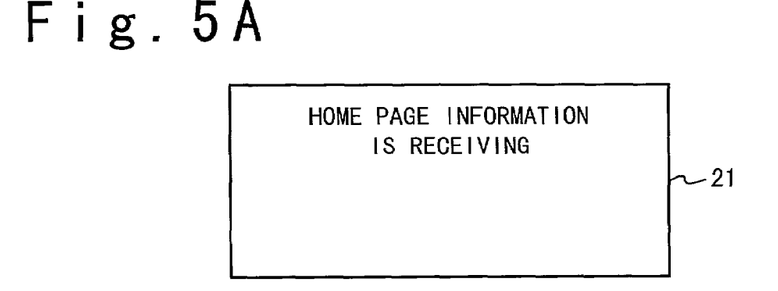
FIG. 5A is a view showing a display example of a display indicating a state at which the data is being transferred, among states until the data are printed after the data are transferred to the facsimile apparatus in this embodiment.

While the Internet data received by the portable terminal 7 are transferred to the facsimile apparatus 100, [Under Reception Of Home Page Information] are displayed on the display 2 of the device body 20, as shown by a symbol 21 of FIG. 5A. The Internet data transferred from the portable terminal 7 to the device body 20 are stored in the browsing and electronic mail function unit 1, as mentioned above.

The case when the Internet data, which are transferred from the portable terminal 7, and/or which are received by the browsing and electronic mail function unit 1 and not received by the portable terminal 7 and then stored in the browsing and electronic mail function unit 1 are recorded in the printer 4 will be described below.

Figure 4:
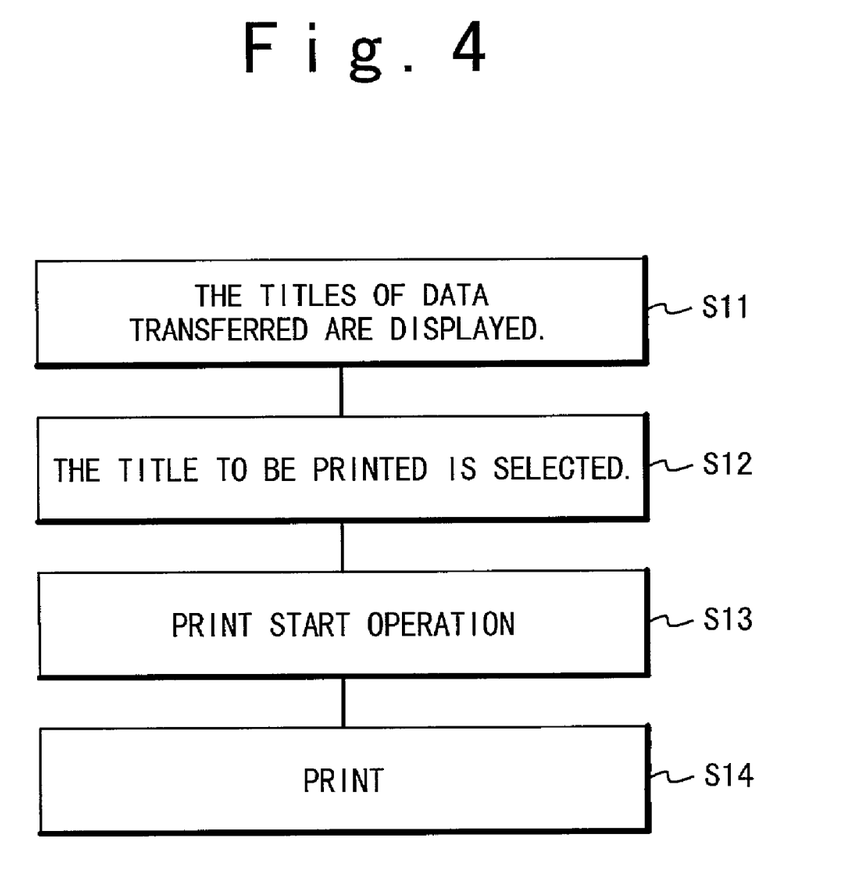
FIG. 4 is a flowchart showing an example of a flow when the data transferred to the facsimile apparatus in this embodiment is printed.
Figure 5B:
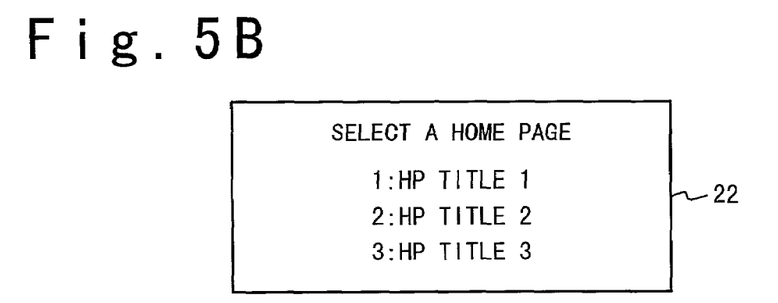
FIG. 5B is a view showing a display example of a display indicating a selection screen of data among the states until the data are printed after the data are transferred to the facsimile apparatus in this embodiment.

At first, a title (home page title) of the Internet data stored in the browsing and electronic mail function unit 1 are displayed on the display 2 of the device body 20, as shown by a symbol 22 of FIG. 5B (a step S11 of FIG. 4). Here, the Internet data in which the title indicated are transferred from one portable terminal 7 or a plurality of portable terminals 7 and/or the data received by the browsing and electronic mail function unit 1.

In the Internet data transferred from each of the plurality of portable terminals 7, its home page are indicated for each of the plurality of portable terminals 7 so as to recognize a portable terminal 7 among the plurality of portable terminals 7 from which the Internet data are transferred. In this case, the home page title is indicated so as to recognize that it is the data received by the browsing and electronic mail function unit 1.

Figure 5C:
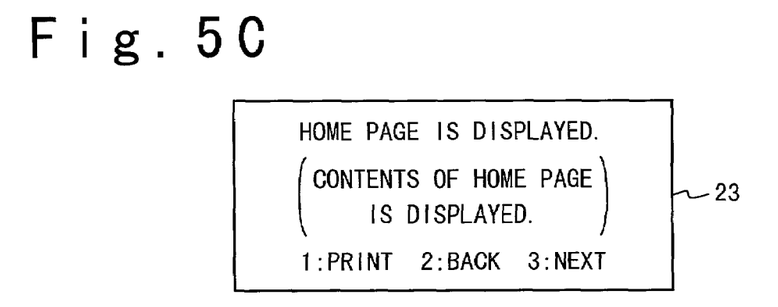
FIG. 5C is a view showing a display example of a screen on which a content of selected data are displayed, among the states until the data are printed after the data are transferred to the facsimile apparatus in this embodiment.

The user of the facsimile apparatus 100 refers to the display 2 denoted by the symbol 22 for displaying home page titles, and operates the input unit 11, and then selects a home page title desired to be displayed (a step S12 of FIG. 4). Here, if [Home Page Title 1] is selected, the content of the home page 1 is displayed on the display 2 (Symbol 23 of FIG. 5C). At this time, the whole of the content of the home page 1 is not always displayed because of the restrictions of the screen size of the display 2 and the like. A part thereof (the simple information) may be displayed.

Figure 5D:
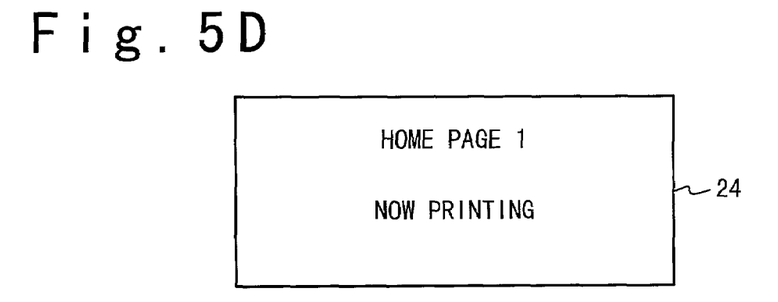
FIG. 5D is a view showing a display example of a display indicating a state at which the selected data are being printed, among the states until the data are printed after the data is transferred to the facsimile apparatus in this embodiment.

The user refers to the display 2 for displaying the content of the home page 1, enters a record command to the input unit 11 (a step S13 of FIG. 4). The controller 5 edits a control command based on the record command, and outputs to the printer 4. The printer 4 records the whole of the content of the home page 1 (including the detailed information) based on the control command (a step S14 of FIG. 4). If the content of the home page 1 is already recorded in the printer 4, the fact that the home page 1 is being printed is displayed on the display 2, as denoted by a symbol 24 of FIG. 5D.

As an actual communication manner of digital data communication X done between the data transfer unit 9 and the radio unit 3, in addition to packet communication of 9600 bps used in the current i-mode, there may be communication of 64 Kbps based on PIAFU and further a communication equal to or higher than 1 Mbps based on Bluetooth.

A digital data communication X done between the cordless slave unit 6 and the radio unit 3 is similar to the above case. Only the simple information in all the data received by the browsing and electronic mail function unit 1 or all the data transferred from the portable terminal 7 are sent from the radio unit 3 to the cordless slave unit 6. The data to be recorded in the printer 4 are stored in the browsing and electronic mail function unit 1. Thus, only the command (record command) for instructing the printer 4 to record is sent from the cordless slave unit 6 to the radio unit 3. The data are not transferred.

The browsing of the Internet and the transmission and reception of the electronic mail can be attained by the browsing and electronic mail function unit 1 or the portable terminal 7.

The display 2 of the device body 20 and the display 6a of the cordless slave unit 6 display thereon only the simple information of each of the Internet data and the electronic mail data, such as the portable terminal 7 corresponding to the current i-mode and the like.

If the detailed information except the simple information in all the Internet data and the electronic mail data that are received by the browsing and electronic mail function unit 1 or transferred from the portable terminal 7 is desired to be read or displayed, the controller 5 responses to a record command inputted from the input unit 11, edits a control command, and outputs to the browsing and electronic mail function unit 1 and the printer 4. The browsing and electronic mail function unit 1 responses to the control command, and outputs the data (including the detailed information) corresponding to the control command to the printer 4. The printer 4 records the data inputted from the browsing and electronic mail function unit 1. Since the printer 4 prints out, it is possible to read the detailed information that is not displayed on the displays 2, 6a.

The user can set the simple information displayed on the displays 2, 6a in all the electronic mail data and the Internet data that are received by the browsing and electronic mail function unit 1 or transferred from the portable terminal 7. For example, in case of picture data included in home page data corresponding to the i-mode, it takes a long time to display on the displays 2, 6a. Thus, a call charge resulting from the time becomes expensive. So, a display speed can be improved if it is designed such that the picture data in the data received by the browsing and electronic mail function unit 1 is not displayed on the displays 2, 6a.

The radio portable terminal 7 such as the current portable telephone, the PHS and the like corresponding to the reception of the electronic mail and the browsing of the Internet such as the i-mode and the like does not have a recorder for recording data. The portable terminal 7 corresponding to the I-mode has only a small capacity of memory. The display 7a of the radio portable terminal 7 is simple. Thus, only the simple information can be displayed of all the received information.

Since the standardized digital data communication X is done between the radio unit 3 and the data transfer unit 9 of the portable terminal 7, the above detailed information is captured by the device body 20, and printed out by the printer 4.

When the browsing of the Internet and the reception of the electronic mail are done by the cordless slave unit, the simple information in all the information received by the browsing and electronic mail function unit 1 is transmitted as digital data from the radio unit 3 to the cordless slave unit 6, through the digital data communication X. The display 6a of the cordless slave unit 6 displays thereon the simple information received from the radio unit 3. If the above detailed information is desired to be read or displayed, a record command edited by the cordless slave unit 6 is inputted through the radio unit 3 to the controller 5, and the above detailed information is printed out by the printer 4 under the control of the controller 5.

This embodiment can provide the following effects. The simple information in the Internet data and the electronic mail data is displayed (schematically displayed) on each of the displays 2, 6a of the device body 20 and the cordless slave unit 6. As necessary, the detailed information is printed out and listed by the printer 4 of the device body 20.

The detailed information of the Internet data and the electronic mail data received by the radio portable terminal 7, such as the portable telephone, the PHS and the like, in which the simple information is only displayed, is transmitted as the digital data to the device body 20. Thus, the detailed information that can not be displayed by the radio portable terminal 7 is printed out by the printer 4. So, it can be displayed.

According to the present invention, the Internet data and/or the electronic mail data received by the terminal serving as the external device are received, and all the reception data are printed out. So, they can be read. Thus, in the present invention, all the reception data can be listed without any display having a wide display area.

What is claimed is:

1. A facsimile apparatus, comprising:
   a radio unit communicating with a terminal apparatus which can receive one of an electronic mail data and Internet data;
   an input unit for registering said terminal apparatus;
   a browsing and electronic mail function unit which has function of browsing a home page of the Internet and transmitting, receiving an electronic mail and storing data including simple information and detailed information of Internet data and electronic mail data which are received by said terminal apparatus;
   a controller, which classifies the Internet and electronic mail data received by the browsing and electronic mail function unit or said terminal apparatus, into simple information and detailed information;
   a display unit displaying a first portion or simple information of one of said electronic mail data and the Internet data received by said radio unit from said terminal apparatus; and
   a print unit responding to a control command edited by the controller by printing a second portion or the detailed information other than said first portion of said one of said electronic mail data and the Internet data received by said radio unit from said terminal apparatus, wherein said second portion is not displayed by said display unit.

2. The facsimile apparatus according to claim 1, further comprising:
   a register unit registering said terminal apparatus; and
   a storing unit storing said one of said electronic mail data and the Internet data received by said radio unit from said terminal apparatus, and
   wherein said storing unit stores said one of said electronic mail data and the Internet data received by said radio unit from said terminal apparatus registered in said register unit, and does not store said one of said electronic mail data and the Internet data received by said radio unit from said terminal apparatus which is not registered in said register unit.

3. The facsimile apparatus according to claim 2, wherein said register unit registers a plurality of said terminal apparatuses, and
   wherein said storing unit stores said one of said electronic mail data and the Internet data received by said radio unit from one of said plurality of said terminal apparatuses registered in said register unit, and does not store said one of said electronic mail data and the Internet data received by said radio unit from one of said plurality of said terminal apparatuses which are not registered in said register unit.

4. The facsimile apparatus according to claim 1, wherein said display unit displays a plurality of titles of said one of said electronic mail data and the Internet data received by said radio unit from said terminal apparatus, and
   wherein said print unit prints one of said electronic mail data and the Internet data corresponding to a selected one of said plurality of titles displayed in said display unit.

5. The facsimile apparatus according to claim 1, further comprising:
   a register unit registering a plurality of said terminal apparatuses; and
   a storing unit storing said one of said electronic mail data and the Internet data received by said radio unit from said plurality of said terminal apparatuses, and
   wherein said display unit shows which one of said plurality of said terminal apparatuses registered in said register unit outputs each of said one of said electronic mail data and the Internet data stored by said storing unit.

6. The facsimile apparatus according to claim 5, wherein said print unit prints said one of said electronic mail data and the Internet data received from one of said plurality of said terminal apparatuses selected with reference to said display unit.

7. The facsimile apparatus according to claim 1, wherein said one of said electronic mail data and the Internet data received by said radio unit from said terminal apparatus is divided into said first and second portions based on the data amount of said one.

8. The facsimile apparatus according to claim 2, wherein said one of said electronic mail data and the Internet data received by said radio unit from said terminal apparatus is divided into said first and second portions based on the kind of the data of said one.

9. The facsimile apparatus according to claim 1, wherein said radio unit communicates with said terminal apparatus wirelessly with the Bluetooth standard.

10. The facsimile apparatus according to claim 1, wherein said radio unit communicates with said terminal apparatus wirelessly with the PIAFS (PHS Internet Access Forum Standard).

11. The facsimile apparatus according to claim 1, wherein the Internet data is the HTML data.

12. The facsimile apparatus according to claim 1, wherein said first portion corresponds to a portion which can be displayed by said terminal apparatus, of said one of said electronic mail data and the Internet data received by said terminal apparatus, and said second portion corresponds to a portion which can not be displayed by said terminal apparatus, of said one of said electronic mail data and the Internet data received by said terminal apparatus.

13. The facsimile apparatus according to claim 1, wherein said first portion corresponds to data of a Web site complied with the Internet connection service for a portable telephone including the i-mode.

14. The facsimile apparatus according to claim 1, wherein said first portion corresponds to a portion other than an attachment file data of an electronic mail data.

15. The facsimile apparatus according to claim 7, wherein a value of the data amount of said one is adjusted by a user of said facsimile apparatus.

16. The facsimile apparatus according to claim 1, further comprising a cordless slave unit for operation of said facsimile apparatus, having a display showing said simple information.

17. A communication system, comprising:
a facsimile apparatus; and
a terminal apparatus, and
wherein said terminal apparatus includes:
a data receive unit receiving one of an electronic mail data and Internet data;
a display unit displaying a first portion of said received one of said electronic mail data and the Internet data; and
a data transfer unit transferring at least a portion of said received one of said electronic mail data and the Internet data, and wherein said facsimile apparatus includes:
a radio unit receiving said at least a portion transferred by said data transfer unit;
a controller dividing said received at least a portion of electronic mail and Internet data into three portion: first portion, second portion and third portion;
a display unit displaying a second portion of said at least a portion received by said radio unit; and
a print unit printing a third portion other than said second portion of said at least a portion received by said radio unit, wherein said third portion is not displayed by said display unit.

18. The communication system according to claim 17, wherein said first portion is substantially identical to said second portion.

19. The communication system according to claim 17, wherein said facsimile apparatus further includes:
a register unit registering said terminal apparatus; and
a storing unit storing said one of said electronic mail data and the Internet data received by said radio unit from said terminal apparatus, and
wherein said storing unit stores said one of said electronic mail data and the Internet data received by said radio unit from said terminal apparatus registered in said register unit, and does not store said one of said electronic mail data and the Internet data received by said radio unit from said terminal apparatus which is not registered in said register unit.

20. The communication system according to claim 17, wherein said display unit displays a plurality of titles of said one of said electronic mail data and the Internet data received by said radio unit from said terminal apparatus, and
wherein said print unit prints one of said electronic mail data and the Internet data corresponding to a selected one of said plurality of titles displayed in said display unit.

21. The communication system according to claim 17, wherein said facsimile apparatus further includes:
a register unit registering a plurality of said terminal apparatuses; and a storing unit storing said one of said electronic mail data and the Internet data received by said radio unit from said plurality of said terminal apparatuses, and
wherein said display unit shows which one of said plurality of said terminal apparatuses registered in said register unit outputs each of said one of said electronic mail data and the Internet data stored by said storing unit.

* * * * *